(12) United States Patent
Han et al.

(10) Patent No.: US 10,583,828 B1
(45) Date of Patent: Mar. 10, 2020

(54) POSITION DETERMINATION

(71) Applicant: Apple Inc., Cupertino, CA (US)

(72) Inventors: Byron B. Han, San Jose, CA (US);
Albert J. Golko, Saratoga, CA (US);
Stephen P. Zadesky, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 224 days.

(21) Appl. No.: 15/275,153

(22) Filed: Sep. 23, 2016

Related U.S. Application Data

(60) Provisional application No. 62/232,814, filed on Sep. 25, 2015.

(51) Int. Cl.
*B60W 30/06* (2006.01)
*G05D 1/02* (2020.01)
(Continued)

(52) U.S. Cl.
CPC ............ *B60W 30/06* (2013.01); *B60W 40/12* (2013.01); *G05D 1/021* (2013.01); *G08G 1/141* (2013.01);
(Continued)

(58) Field of Classification Search
CPC ...... B60W 30/06; B60W 10/18; B60W 10/20; B60W 40/02; B60W 40/12; B62D 15/0285; B62D 6/00; G06Q 10/08; G05D 1/02; G05D 1/00; G05D 1/021; G05D 1/0027; G05D 1/0291; G08G 1/143; G08G 1/146; G08G 1/22; G08G 1/14; G08G 1/141; G07C 5/008; G07C 5/00; H04L 67/12; H04L 29/08; B60K 35/00; B60K 37/06; A61B 5/6893; B60N 2/002; B60R 21/213; B60R 21/233; B60R 21/235; B60R 21/01512; G01G 23/3728; G01G 19/4142; G01G 19/12; G01G 19/44; G02B 27/01; H01Q 1/3233; H01Q 1/325; G16H 40/63; G16H 50/30; G16H 30/20; G06F 19/3418; G06F 19/321; B60T 7/22; E04H 6/422; E05B 47/00; F16H 63/483
See application file for complete search history.

(56) References Cited

U.S. PATENT DOCUMENTS

2007/0057781 A1* 3/2007 Breed .................... B60K 35/00
340/457.1
2010/0156671 A1 6/2010 Lee et al.
(Continued)

*Primary Examiner* — Behrang Badii
(74) *Attorney, Agent, or Firm* — Robert C. Kowert; Kowert, Hood, Munyon, Rankin & Goetzel, P.C.

(57) ABSTRACT

Some embodiments provide an autonomous navigation system which autonomously parks a vehicle in a selected available parking space. The vehicle can be parked in a particular parking position in the parking space based on one or more factors. The particular parking position can be selected from a set of potential parking positions based on an aggregate intersection risk value associated with the particular parking position being less than at least one other potential parking position. The aggregate intersection risk value can be determined based on one or more of a proximity of one or more adjacent vehicles to the parking space, a door sweep volume of the one or more adjacent vehicles, body morphology of one or more present occupants of the vehicle, and predicted occupancy of the vehicle.

20 Claims, 11 Drawing Sheets

(51) Int. Cl.
  *G08G 1/14*   (2006.01)
  *B60W 40/12*  (2012.01)
  *E04H 6/42*       (2006.01)
  *B60W 10/18*      (2012.01)
  *E05B 47/00*      (2006.01)
  *B62D 6/00*       (2006.01)
  *B60W 10/20*      (2006.01)
  *F16H 63/48*      (2006.01)
  *B60T 7/22*       (2006.01)
  *B62D 15/02*      (2006.01)
  *G05B 15/02*      (2006.01)

(52) U.S. Cl.
  CPC ............... *B60T 7/22* (2013.01); *B60W 10/18* (2013.01); *B60W 10/20* (2013.01); *B62D 6/00* (2013.01); *B62D 15/0285* (2013.01); *E04H 6/422* (2013.01); *E05B 47/00* (2013.01); *F16H 63/483* (2013.01); *G05B 15/02* (2013.01); *G05D 1/0297* (2013.01)

(56) References Cited

U.S. PATENT DOCUMENTS

| | | |
|---|---|---|
| 2012/0056758 A1 | 3/2012 | Kuhlman et al. |
| 2013/0144492 A1 | 6/2013 | Takano et al. |
| 2014/0244073 A1* | 8/2014 | Okamura ........... B62D 15/0285 701/2 |
| 2014/0353048 A1* | 12/2014 | Kriger ................. A61B 5/6893 177/1 |
| 2015/0241241 A1 | 8/2015 | Cudak et al. |
| 2015/0346727 A1 | 12/2015 | Ramanujam |
| 2016/0311429 A1* | 10/2016 | Holland-Letz ..... B62D 15/0285 |
| 2017/0212511 A1* | 7/2017 | Paiva Ferreira ....... G08G 1/143 |

\* cited by examiner

POSITION DETERMINATION

This application claims benefit of priority of U.S. Provisional Application Ser. No. 62/232,814, filed Sep. 25, 2015, which is hereby incorporated by reference herein in its entirety.

BACKGROUND

Technical Field

This disclosure relates generally to autonomous navigation of a vehicle, and in particular to an autonomous navigation system which can be included in a vehicle and which navigates the vehicle in an environment which includes one or more vehicle parking spaces.

Description of the Related Art

The rise of interest in autonomous navigation of vehicles, including automobiles, has resulted in a desire to develop autonomous navigation systems which can autonomously navigate (i.e., autonomously "drive") a vehicle through various routes, including one or more roads in a road network, such as contemporary roads, streets, highways, etc.

In some cases, autonomous navigation is enabled via an autonomous navigation system (ANS) which can process and respond to detection of various elements in an external environment, including static features (e.g., roadway lanes, road signs, etc.) and dynamic features (present locations of other vehicles in a roadway on which the route extends, present locations of pedestrians, present environmental conditions, roadway obstructions, etc.) along a route in real-time as they are encountered, thereby replicating the real-time processing and driving capabilities of a human being.

In some cases, an autonomous navigation system autonomously positions a vehicle in which the system is located, also referred to herein as the "ego-vehicle", in a parking space, also referred to as "parking" the ego-vehicle, based on geometric considerations, including one or more of the size and dimensions of the ego-vehicle and the parking spot geometry. For example, the ego-vehicle can be parked in the parking space in a particular position, also referred to herein as the parking position of the ego-vehicle, where the parking position of the ego-vehicle relative to the parking space is determined based on one or more geometric features. For example, an autonomous navigation system navigating a vehicle can determine a parking position of the ego-vehicle within a given parking space based on centering a surface area overlay of the ego-vehicle on the driving surface, also referred to as the ego-vehicle "footprint", a midpoint of the parking space, so that the ego-vehicle, when parked in the parking position, is centered within the parking space.

SUMMARY OF EMBODIMENTS

Some embodiments provide an autonomous navigation system which autonomously parks a vehicle in an environment in which the vehicle is located. The autonomous navigation system, in response to a command to park the vehicle, determines a particular parking position of the vehicle within a detected available parking space and generates a set of control commands which, when executed by one or more control elements installed in the vehicle, cause the vehicle to be navigated along a driving route which results in the vehicle being positioned in the particular parking position in the detected available parking space. The particular parking position is determined based at least in part upon a position of at least one at least one detected vehicle located proximate to the detected available parking space.

Some embodiments provide an autonomous navigation system which autonomously parks the vehicle in an environment in which the vehicle is located. The autonomous navigation system, in response to a command to park the vehicle, select a particular parking position of the vehicle within a detected available parking space, from a set of potential parking positions of the vehicle within the detected available parking space, based at least in part upon detection of one or more occupants in one or more particular portions of an interior of the vehicle; and generates a set of control commands which, when executed by one or more control elements installed in the vehicle, cause the vehicle to be navigated along a driving route which results in the vehicle being positioned in the particular parking position in the detected available parking space.

Some embodiments provide an autonomous navigation system which autonomously parks the vehicle in an environment in which the vehicle is located. The autonomous navigation system, in response to a command to park the vehicle, selects a particular parking position of the vehicle within a detected available parking space, from a set of potential parking positions of the vehicle within the detected available parking space, based at least in part upon a predicted occupancy of one or more portions of an interior of the vehicle; and generate a set of control commands which, when executed by one or more control elements installed in the vehicle, cause the vehicle to be navigated along a driving route which results in the vehicle being positioned in the particular parking position in the detected available parking space.

Figure 1:
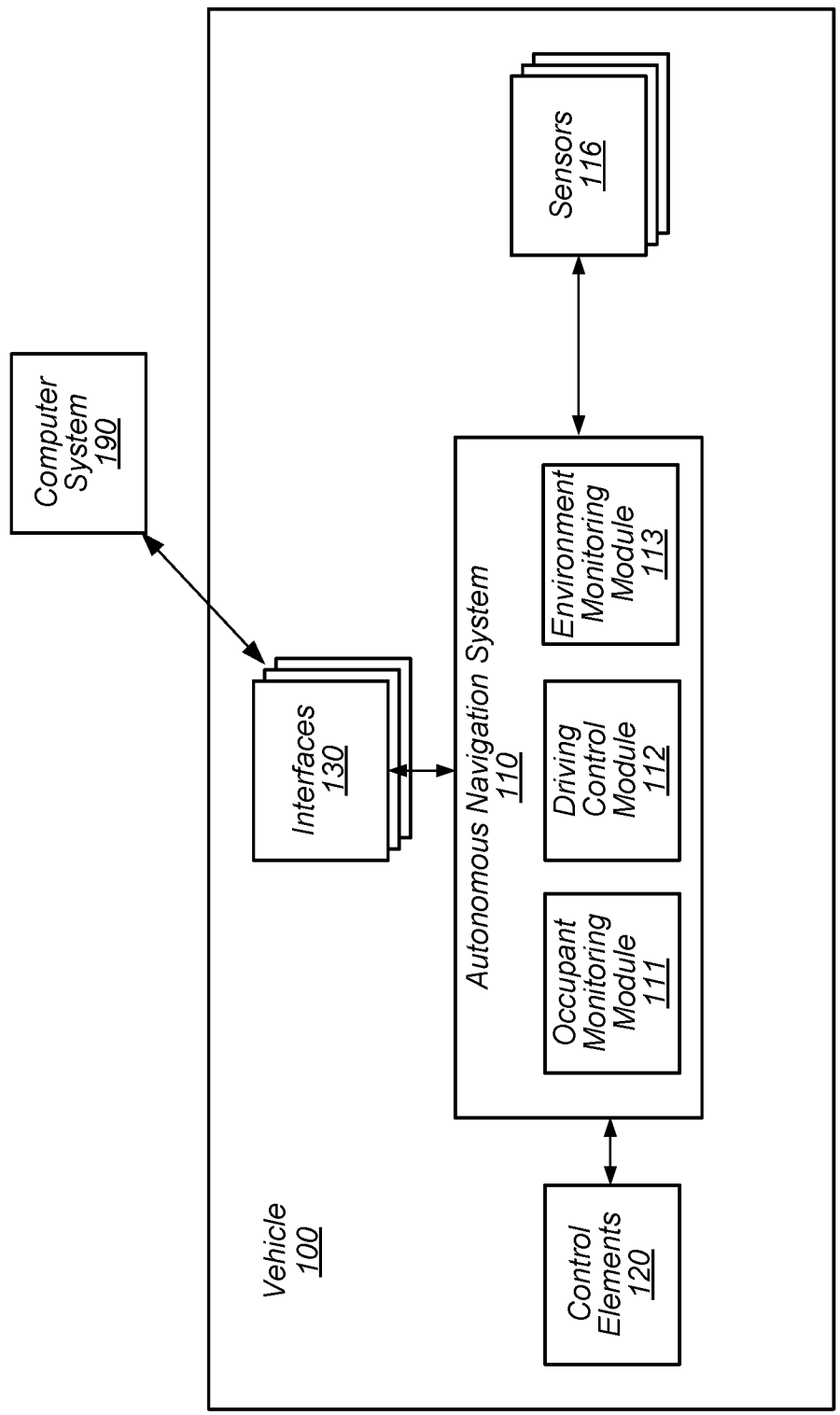
FIG. 1 illustrates a schematic block diagram of a vehicle which comprises an autonomous navigation system (ANS) which is configured to park the vehicle in a selected parking position in a selected parking space, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units. . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments include one or more vehicles in which an autonomous navigation system ("ANS") is included, where the ANS is configured to navigate the vehicle to a position within a space in the environment which is configured for vehicle parking. Such a space can be referred to herein as a parking space, and the position of the vehicle in the parking space to which the ANS navigates the vehicle can be referred to as a parking position.

In some embodiments, the ANS installed in a vehicle is configured to navigate the vehicle in which the ANS is installed, also referred to herein as the ego-vehicle, to a stop in a particular position within a parking space. The ANS can identify and select a particular parking space in the environment in which to stop the vehicle, also referred to herein as parking the vehicle. The ANS can further determine a particular parking position within the particular parking space to park the vehicle, and the ANS can navigate the vehicle to be parked in the particular parking position within the particular parking space.

A parking position can represent a portion of the parking space which can be at least partially occupied by the ego-vehicle. In some embodiments, the parking position is sized and shaped to at least partially correspond to the geometry of the ego-vehicle. For example, a parking position can include a surface area of a driving surface, including a surface area of a parking space, over which a vehicle is positioned when the vehicle is parked in the given parking position. Such a surface area can be referred to as a driving surface "footprint" of the ego-vehicle. In some embodiments, the parking position can include a particular volume space of the environment which can be occupied by the ego-vehicle when the ego-vehicle is parked in the given parking position.

In some embodiments, the parking position includes one or more of a particular portion of the environment through which a door included in the vehicle can sweep when the door is at least partially opened. The footprint of such a portion can be referred to as the door sweep area of the door, and the volume space of such a portion can be referred to as the door sweep volume of the door. As referred to herein, the door sweep area of a door and the door sweep volume of a door are referred to herein as the door sweep volume of the door. A parking position which includes one or more of a door sweep area, door sweep volume, etc. of a door included in the vehicle can include said one or more of a door sweep area, door sweep volume, etc. extending from a particular position at a boundary of the vehicle footprint, volume space, etc. which corresponds to a relative position of the door on the exterior of the ego-vehicle.

In some embodiments, a parking position includes a footprint area of a vehicle which is parked in a particular orientation within a parking space. For example, a parking position can include a footprint of a vehicle which is positioned with a front end of the vehicle pointing towards an exit of the parking space. Where the ANS installed in a vehicle navigates the vehicle to a parking position, in a parking space, where the parking position includes a particular orientation of the vehicle, the ANS can navigate the vehicle to be parked in the particular orientation in the parking position.

In some embodiments, the ANS autonomously navigates the vehicle along a driving route via generation of control commands associated with various control elements of the vehicle, where the control commands, when received at the associated control elements, cause the control elements to navigate the vehicle along the driving route.

In some embodiments, the ANS generates a driving route through an external environment based at least in part upon various objects included in the external environment. Such objects can include one or more static elements, including roadway features, including roadway lanes, curbs, etc., parking space features, including sparking space boundary markings, traffic signs and traffic signals, flora, artificial structures, inanimate objects, etc. Such objects can include one or more dynamic elements, including a time of day, local weather conditions, fauna, traffic participants, etc. in the external environment. Traffic participants can include vehicles, pedestrians, some combination thereof, etc. located in the external environment, including traffic participants located proximate to or in the roadway along which the vehicle is located.

As referred to herein, a "driving route" includes a pathway along which a vehicle is navigated. A driving route can extend from a starting location to another separate destination location, extend back to a destination location which is the same as the starting location, etc. A route can extend along one or more various portions of one or more various roadways. For example, a route between a home location and a work location can extend from a home driveway, through one or more residential streets, along one or more portions of one or more avenues, highways, toll ways, etc., and to one or more parking spaces in one or more parking areas. Such routes can be routes which a user repeatedly navigates over time, including multiple times in a given day (e.g., routes between home and work locations may be travelled at least once in a given day).

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a schematic block diagram of a vehicle 100 which comprises an autonomous navigation system (ANS) 110 which is configured to park the vehicle 100 in a selected parking position in a selected parking space, according to some embodiments. Some or all of the ANS 110 illustrated in FIG. 1, including one or more of the modules 111, 112, 113, etc., can be included in any of the embodiments of ANSs included in any of the embodiments herein.

Vehicle 100 includes an autonomous navigation system ("ANS") 110, a set of one or more sensor devices 116, a set of one or more control elements 120, and a set of one or more user interfaces 130.

Sensor devices 116 can include one or more sensor devices which are configured to monitor one or more aspects of an external environment in which the vehicle is located. Monitoring an aspect of an external environment can include generating, at the sensor device, sensor data which includes information regarding the aspect of the external environment; such sensor data can be referred to as a sensor data representation of the aspect of the external environment. For example, a sensor device 116 can include one or more of a camera device which generates images of one or more portions of the external environment, a light beam scanning device which generates one or more point clouds of one or more portions of the external environments, a radar device which generates radar data associated with one or more portions of the external environment, etc. Aspects of an external environment which can be monitored include one or more objects included in the environment, where the one or more objects can include one or more static elements, dynamic elements, etc. For example, a sensor device 116 which includes a camera device can capture images of an external environment which includes images of static elements, including parking space boundary markers, roadway curbs, physical objects located adjacent to a parking space, inanimate obstacles in the roadway, etc., images of dynamic elements including traffic participants, fauna, ambient environment conditions, weather, etc.

Sensor devices 116 can include one or more sensor devices which are configured to monitor one or more aspects of the vehicle 100 interior. Such sensor devices can include camera devices configured to collect image data of one or more occupants in the vehicle interior, control element sensors which monitor operating states of various driving control elements 120 of the vehicle, some combination thereof, etc. One or more of sensor devices 116 can generate one or more sensor data representations of one or more portions of the vehicle interior, including one or more sensor data representations of at least some portion of one or more occupants in the one or more portions of the vehicle interior. Such sensor data representations generated by one or more sensor devices 116 can be communicated to ANS 110 and used by the ANS 110 to determine one or more of occupancy of one or more portions of the vehicle interior, quantity of occupants of the vehicle interior, body morphologies associated with one or more occupants of the vehicle interior, profiles associated with one or more occupants of the vehicle interior, personal data associated with one or more particular occupants of the vehicle interior, etc.

The control elements 120 included in vehicle 100 include various control elements, including actuators, motors, etc. which each control one or more components of the vehicle which cause the vehicle to be navigated through an external environment. For example, a control element 120 can include one or more of a braking assembly (also referred to herein interchangeably as a braking system) which applies braking pressure to one or more wheel assemblies of the vehicle to cause the vehicle to be decelerated, a throttle assembly which adjusts the acceleration of the vehicle 100 through an external environment, a steering assembly which adjusts one or more configurations of one or more wheel assemblies which causes the vehicle to be adjustably navigated in one or more various directions through the external environment, etc. A control element can execute one or more various adjustments to navigation of the vehicle based on receipt and execution of one or more various control commands at the control elements from one or more of a user interface 130, the ANS 110, etc.

The one or more interfaces 130 can include one or more user interfaces, also referred to herein interchangeably as input interfaces, including one or more driving control interfaces with which an occupant of the vehicle 100 can interact, such that the driving control interfaces generate control commands which cause one or more control elements 120 to adjustably navigate the vehicle 100, based on one or more occupant interactions with one or more interfaces 130. For example, one or more interfaces 130 can provide an interactive interface via which an occupant can provide a command, to the ANS 110, to park the vehicle 100. The parking command, in some embodiments, is independent of specifying a specific parking space in which to park the vehicle and comprises a command to the ANS to select a parking space and park the vehicle 100 in the selected parking space. The parking command can comprise a command to the ANS 110 to park the vehicle 100 in a parking space located within a certain proximity of the vehicle 100 in the environment. In some embodiments, where the ANS 110 navigates the vehicle 100 along a driving route, the driving route can include navigating the vehicle 100 to a parked position in a parking spot located within a certain proximity of a destination location of the driving route. As a result, the ANS 110 can, upon navigating to within a certain proximity of a destination location of the driving route, select a parking space located within a certain proximity of the destination location and park the vehicle 100 in the selected parking space as part of navigating the vehicle to the destination location.

In some embodiments, one or more input interfaces 130 included in the vehicle 100 provide one or more instances of information to occupants of the vehicle, including indications of whether the vehicle is being navigated via autonomous driving control of the vehicle 100 by ANS 110, whether the vehicle is being navigated to a parking position based on execution of a parking command provided to the ANS 110, whether the vehicle is being navigated to a parking position based on implementation of a driving route, some combination thereof, etc.

In some embodiments, vehicle 100 comprises one or more interfaces 130 which are configured to be communicatively coupled to one or more computer systems 190 which are separate from the vehicle 100, including one or more user devices supporting one or more users, one or more remotely located computer systems, etc. Such users can include one or more occupants of the vehicle 100, and the one or more computer systems 190 can include one or more user devices supporting the one or more occupants and located within an interior of the vehicle 100. In some embodiments, the ANS 110 can communicate with the one or more computer systems 190 via the one or more interfaces 130 and can access information associated with one or more particular user profiles, including face recognition data, body morphology data, door spacing preference data, driving history data, personal schedule data, etc.

In some embodiments, one or more instances of personal data can be accessed by ANS 110. For example, in some embodiments, ANS 110 can process sensor data, generated by one or more sensor devices 116, and, based on personal data including facial recognition data, associated user device detection, etc., identify a particular occupant in the vehicle interior as being associated with a particular user profile. Users can benefit from use of personal data by the ANS. For example, the personal data can be used by the ANS 110 to park the vehicle 100 in a parking position which accommodates one or more of a body morphology of an occupant, spacing preferences of the occupant, predicted occupants determined based on a personal schedule of a detected occupant, etc.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

ANS 110 includes various modules 111, 112, 113 which can be implemented by one or more computer systems. ANS 110 autonomously navigates vehicle 100 along one or more driving routes, based at least in part upon sensor data generated by one or more sensor devices 116.

Driving control module 112 can determine a driving route which navigates the vehicle 100 to be parked in a particular parking position in a particular parking space based at least in part upon at least some sensor data generated by one or more sensor devices 116, including position data indicating a geographic position of the vehicle 100 and a world model, stored in one or more memory storage devices included in the vehicle 100, one or more remotely-located systems external to the vehicle 100, etc. Module 112 can generate a driving route based at least in part upon sensor data representations, generated by one or more sensor devices 116, of one or more parking spaces, objects located proximate to the parking space, etc.

In some embodiments, the module 112 generates one or more sets of control elements commands which are communicated to one or more control elements 120 in the vehicle 100 and cause the control elements 120 to navigate the vehicle 100 along a driving route. The module 112 can generate control commands based on a driving route, where the control commands, when executed by the control elements 120, cause the vehicle 100 to be navigated along the driving route. Navigating the vehicle 100 along a driving route can include navigating the vehicle to be parked in a particular parking position, which can include being parked in a particular orientation, within a particular parking space located in the environment.

ANS 110, in some embodiments, includes an environment monitoring module 113 which is configured to monitor one or more aspects of an external environment, including one or more objects of the environment, based on processing sensor data generated by one or more sensor devices 116. The module 113 can, based on the processing, identify various static elements and dynamic elements in the external environment, including one or more parking spaces, one or more objects located proximate to the one or more parking spaces, etc. In some embodiments, the module 113 can, based on processing a sensor data representation of a vehicle located in the environment, implement recognition of one or more features of the vehicle, including a position of one or more doors of the vehicle, a vehicle type of the vehicle, an intersection risk value associated with the vehicle, etc. The intersection risk value can be determined based on the vehicle type. Module 113 can identify a position of one or more doors, a door sweep area, volume, etc. of the vehicle, a vehicle type of the vehicle, etc. based on identifying a unique identifier of the vehicle, including information located on a license plate, data generated by a signal generator device included in the vehicle, etc. The module 113 can identify various properties of the vehicle, including the vehicle type, based on communicating with a remote computer system 190 and accessing a database where the detected unique identifier can be correlated with a profile associated with the detected vehicle, where the profile can include information indicating the vehicle type. The module 113 can determine the vehicle type, which can include manufacturer, make, model, etc. based on processing a sensor data representation of the vehicle, accessing a database which indicates door positions, door sweep area, volume, etc., intersection risk value associated with the vehicle, etc.

ANS 110 can include an occupant monitoring module 111 which processes sensor data representations of one or more portions of the vehicle interior and monitors occupancy of the vehicle interior. The module 111 can identify one or more occupants located in one or more particular portions of the vehicle, determine that one or more occupants are associated with one or more user profiles, associated one or more occupants with one or more body morphologies, determine one or more spacing weight values associated with the one or more occupants, etc.

Figure 2:
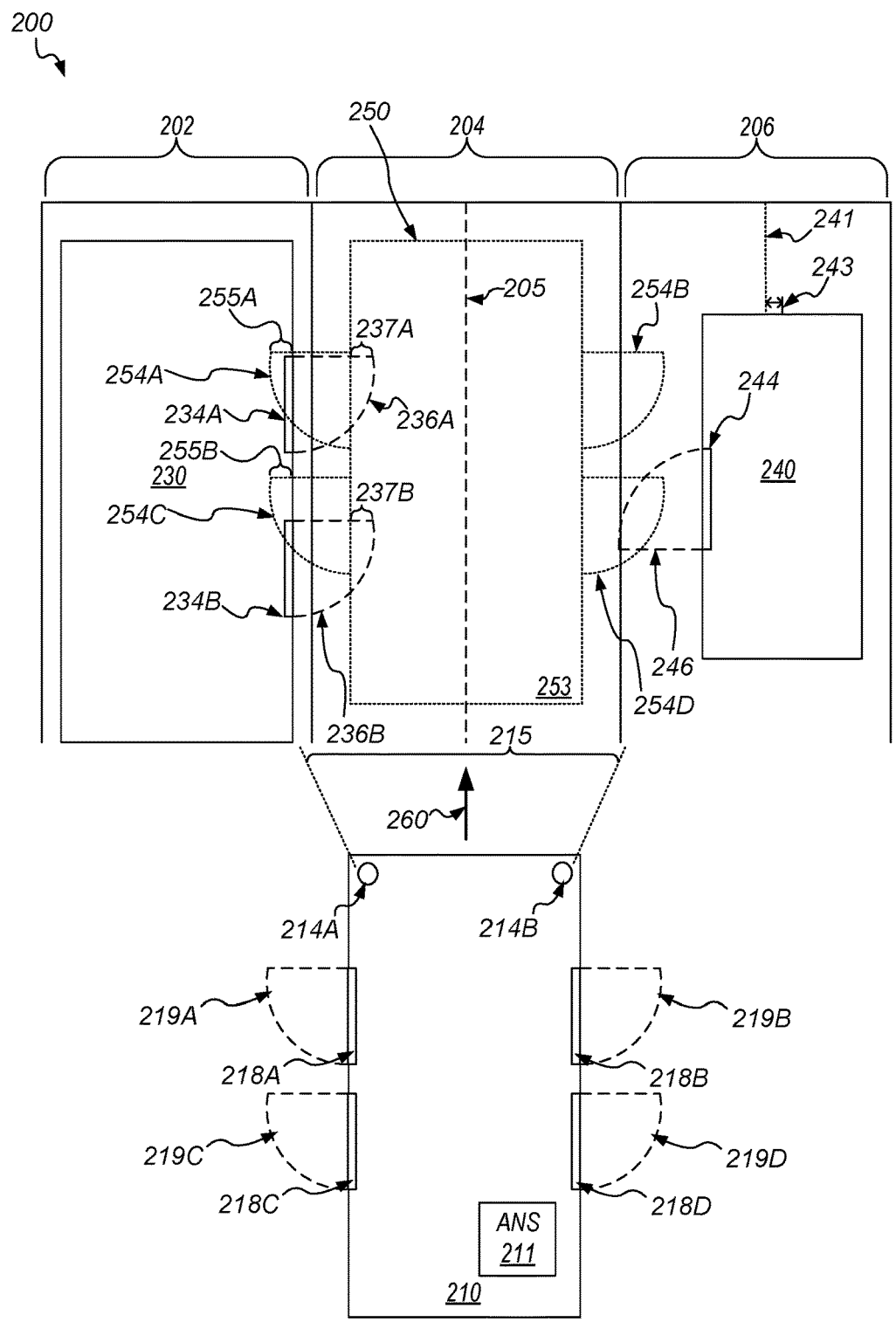
FIG. 2 illustrates an overhead view of an environment in which an ego-vehicle and parking spaces are located and where an ANS installed in the vehicle determines a particular parking position in a particular available parking space in which the vehicle can be parked, according to some embodiments.

FIG. 2 illustrates an overhead view of an environment 200 in which an ego-vehicle 210 and parking spaces 202-206 are located and where an ANS 211 installed in the vehicle 210 determines a particular parking position 250 in a particular available parking space 204 in which the vehicle 210 can be parked, according to some embodiments. Vehicle 210 can include any of the embodiments of vehicles included herein, and ANS 211 can include any of the embodiments of ANSs included herein.

In some embodiments, an ANS installed in a vehicle is configured to determine a parking position in a parking space, and park 260 the ego-vehicle in the determined parking position, based at least in part upon one or more determine geometric features of the parking space.

As shown, vehicle 210 is located near a set of parking spaces 202-206, and sensor devices 214A-B installed in a front portion of the vehicle 210 are monitoring 215 a particular available parking space 204. The available parking spot is identified by the ANS 211 based on processing sensor data generated by sensors 214A-B and determining that spaces 202 and 206 are occupied by vehicles 230, 240. ANS 211 determines various geometric properties of the parking space 204, including a centerline 205.

ANS 211, in some embodiments, is configured to select a particular parking position in which to park the ego-vehicle 210 in the available parking space 204 based on the geometric features of the parking space 204. As shown in FIG. 2, the particular parking position 250 shown in FIG. 2 is aligned on the centerline of the space 204.

In some embodiments, parking a vehicle in a parking position selected based on parking space geometric features can result in a risk of collision between at least some part of the vehicle and at least some part of another object located in the environment, including another vehicle. For example, as shown in the illustrated embodiment, vehicles 230 and 240 are parked in spaces 202 and 206, where vehicle 230 includes doors 234A-B and vehicle 240 includes door 244. As shown, doors 234A-B are associated with respective door sweep volumes 236A-B and door 244 is associated with door sweep volume 246. While parking 260 vehicle 210 in position 250 may not result in an overlap of the door sweep volume 246 with the vehicle, based at least in part upon vehicle 240 being parked offset 243 from the centerline 241 of space 206 away from space 204, the footprint 253 portion of the parking position 250 overlaps 237A-B with the door sweep volumes 234A-B, thereby posing a risk that one or more of the doors 254A-B of vehicle 230 can collide with vehicle 210 if vehicle 210 is parked in position 250. Furthermore, the doors 218A-D of vehicle are associated with door sweep volumes 219A-D which correspond to portions 254A-D of the parking position, and the portions 254A, C overlap 255A-B with the vehicle 230, thereby posing a risk that one or more of the doors 218A, C of the ego-vehicle 210 can collide with vehicle 230 if the ego-vehicle is parked in position 250.

Figure 3A:
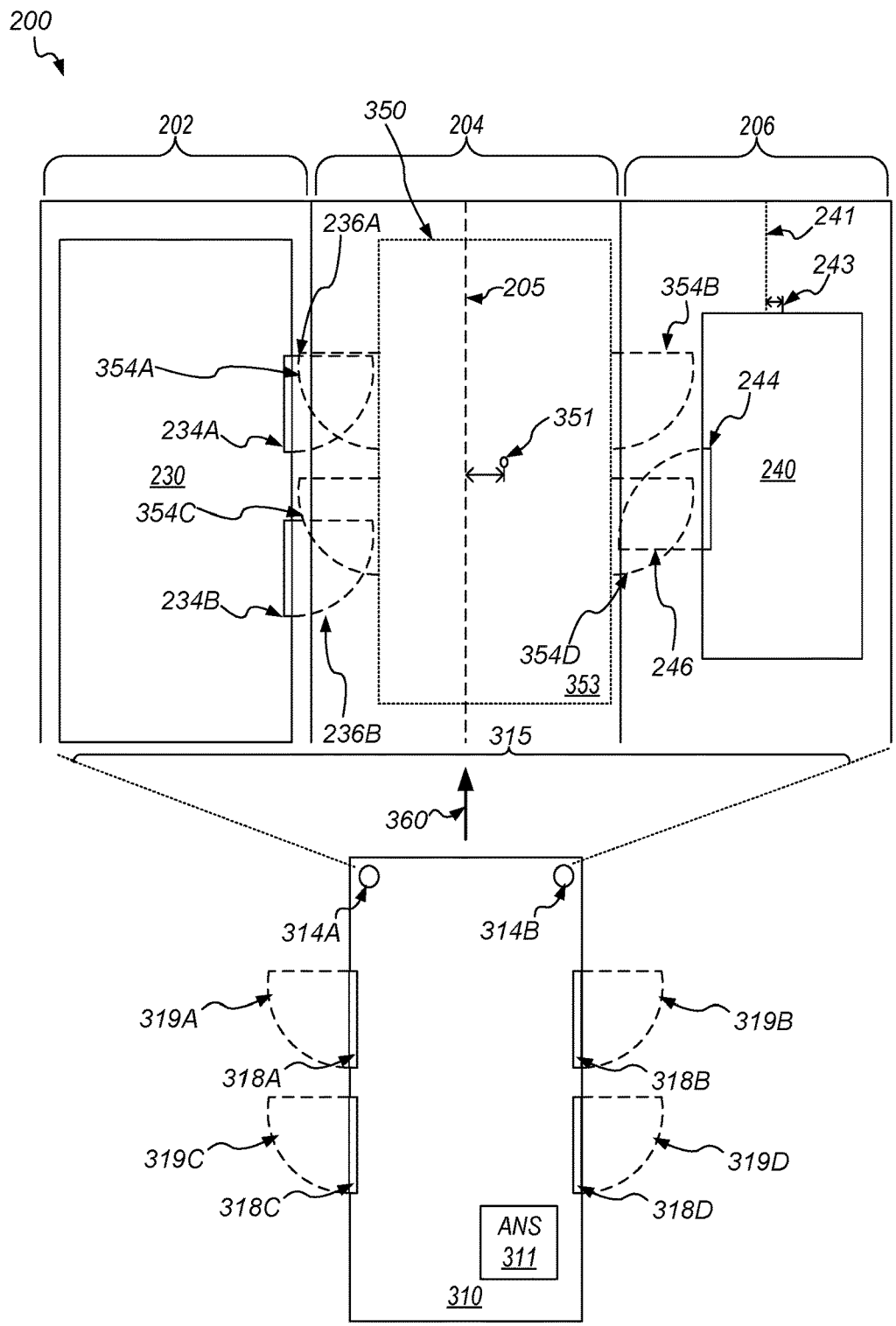
FIG. 3A illustrates an overhead view of an environment in which an ego-vehicle and parking spaces are located and where an ANS installed in the vehicle determines a particular parking position in a particular available parking space in which the vehicle can be parked, according to some embodiments.

FIG. 3A illustrates an overhead view of an environment 300 in which an ego-vehicle 310 and parking spaces 202-206 are located and where an ANS 311 installed in the vehicle 310 determines a particular parking position 350 in a particular available parking space 304 in which the vehicle 310 can be parked, according to some embodiments. Vehicle 310 can include any of the embodiments of vehicles included herein, and ANS 311 can include any of the embodiments of ANSs included herein.

In some embodiments, an ANS installed in a vehicle is configured to determine a parking position in a parking space, and park 460 the ego-vehicle in the determined parking position, based at least in part upon a position of one or more proximate objects located adjacent to the parking space, including one or more vehicles parked in one or more adjacent parking spaces. The ANS can assign intersection risk values to one or more portions of the detected vehicles, including one or more doors sweep volumes associated with one or more doors of the vehicles, and can determine, from a set of potential parking positions in a parking space, a particular parking position which minimizes the aggregate intersection risk value associated with the parking position. The aggregate intersection risk value can be based on various factors, including a proximity of one or more objects to the parking position, including one or more door sweep volumes of the one or more objects.

As shown in FIG. 3A, the ANS 311 can select a parking position 350, which includes a portion 353 corresponding to a footprint of the vehicle 310 and a set of portions 354A-D corresponding to door sweep volumes 319A-D of the doors 318A-D of the vehicle 310, based on a determination that the parking position 350 is associated with an aggregate intersection risk value which is less than at least one other potential parking position in the parking space 204. An aggregate intersection risk value can be determined based on separate intersection risk values associated with separate portions 353-354 of the position 350, including a sum of the separate values. A separate intersection value can be determined, for a given parking position portion, based on a proportion of overlap between the parking position portion and one or more particular portions of one or more other objects in the environment, including another vehicle in the environment, a door sweep volume of another vehicle, etc. The intersection risk value can be determined based at least in part upon a proportion of the overlap of the parking position portion with the other object and one or more weight values assigned to one or more of the parking position portion and the one or more other object.

As shown, the selected parking position 350 in FIG. 3A positions the ego-vehicle 310 in an offset 351 from the centerline 205 of the parking space, such that the vehicle 310, when parked 360 in the position 350, is positioned sufficiently distant from vehicles 230, 240 that overlap between the door sweep volumes 236A-B, 246 of the respective doors 234A-B, 244 of the vehicles 230, 240 is avoided. Similarly, the portions 354A-D of the parking position 350 corresponding to the door sweep volumes 319A-D of the doors 318A-D of vehicle 310 do not overlap with any portion of vehicles 230, 240, so that intersection between any portion of the vehicle 310 and vehicles 230, 240 is avoided when vehicle 310 is parked in position 350. As a result, intersection risk values associated with the various portions 353, 354 of the position 350 can be null values, minimal values, etc. base on the absence of overlap. Because the aggregate intersection risk value associated with position 350 can be less than an aggregate intersection risk value associated with another potential parking position, including the parking position 250 illustrated in FIG. 2 which includes overlap between portions of position 250 and portions of vehicle 230, including the door sweep volumes 234A-B of vehicle 230, the ANS 311 can select position 350 instead of position 250 and can park 360 the vehicle 310 in position 350 in parking space 204.

Figure 3B:
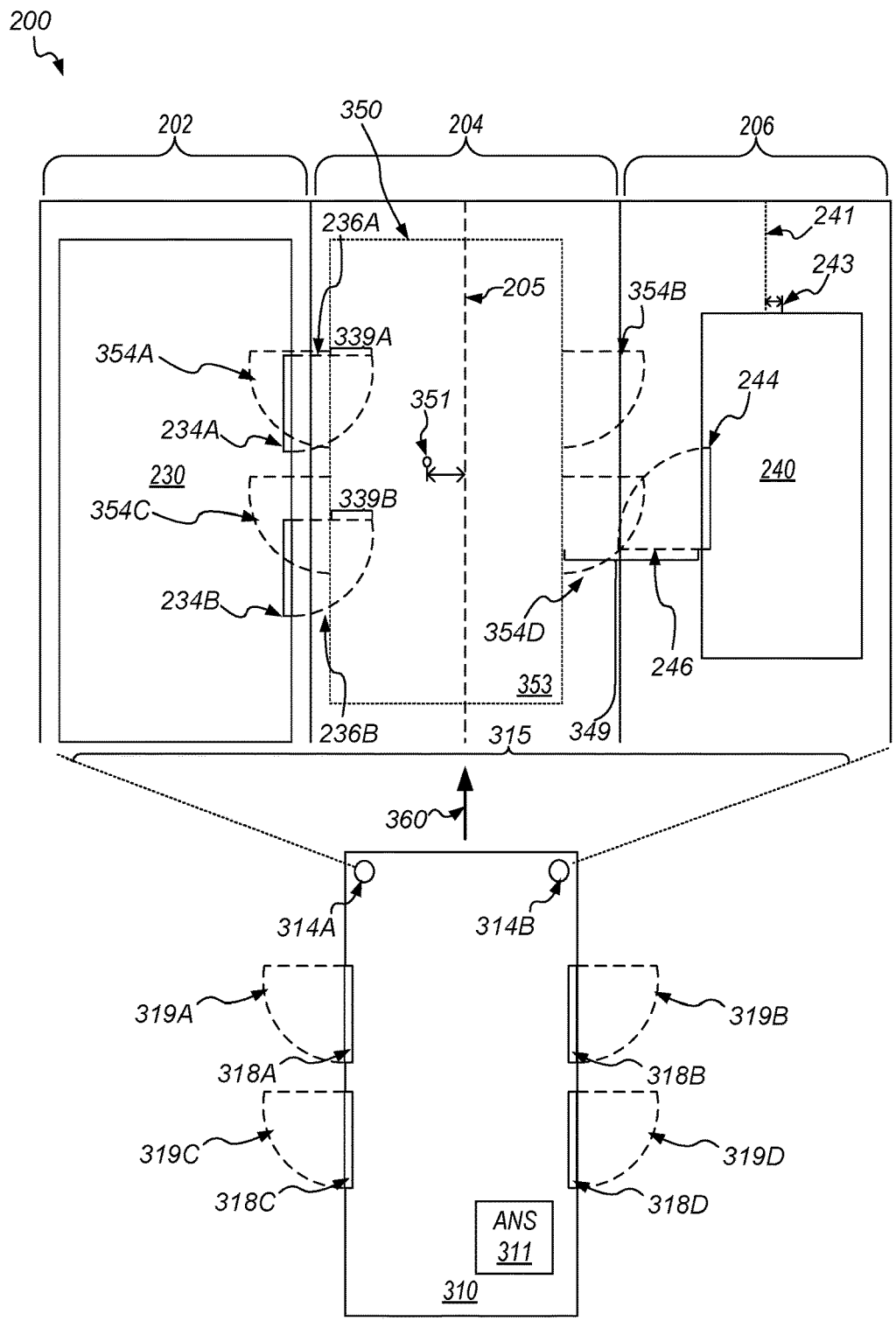
FIG. 3B illustrates an overhead view of an environment in which an ego-vehicle and parking spaces are located and where an ANS installed in the ego-vehicle determines a particular parking position in a particular available parking space 304 in which the ego-vehicle can be parked, according to some embodiments.

FIG. 3B illustrates an overhead view of an environment 200 in which an ego-vehicle 310 and parking spaces 202-206 are located and where an ANS 311 installed in the vehicle 310 determines a particular parking position 350 in a particular available parking space 304 in which the vehicle 310 can be parked, according to some embodiments. Vehicle 310 can include any of the embodiments of vehicles included herein, and ANS 311 can include any of the embodiments of ANSs included herein.

In some embodiments, ANS 311 selects a particular parking position 350 which results in the vehicle 310 being positioned in parking space 204 such that the door sweep volume of one or more doors of one or more of the ego-vehicle 310 and an adjacent vehicle 230 overlap with one or more of the ego-vehicle 310 and the vehicle 230, based on an intersection risk value assigned to one or more portions of the vehicle 230 being less than another intersection risk value assigned to one or more portions of another adjacent vehicle 240. For example, ANS 211 may determine that a parking position 350 which results in vehicle 310 being positioned in an offset 351 from the centerline 205 away from the vehicle 240 results in a minimum aggregate intersection risk value, even though the door sweep volumes 236A-B of vehicle 230 overlap 339A-B with the vehicle 310 in the position 350, based at least in part upon the vehicle 230 being associated with a reduced intersection risk value, relative to the vehicle 240. The aggregate intersection risk value for position 350 can be based at least in part on an intersection risk value assigned to vehicle 240 and a proximity 349 of the position 350 to the vehicle 240. The ANS 211 can determine an intersection risk value for one or more of the vehicles 230, 240 based at least in part upon determining a vehicle type of the one or more vehicles. In some embodiments, the parking position may be restricted to being at least a certain minimum spacing distance from a proximate environmental element, including a proximate parked vehicle. For example, ANS 311 can determine a position 350 which is associated with a minimum aggregate intersection risk value which also includes the position being spaced at least a minimum spacing distance from both vehicles 230, 240, and cause vehicle 310 to be parked in the position 350. As a result, the ANS 311 selects a parking position 350 which is spaced sufficiently distant from vehicles 230, 240 to provide at least a minimum protection against collision between two or more of vehicles 310, 230, 240. Where the position 350 which is associated with a minimum intersection risk value and which is spaced at least the minimum spacing distance from both vehicle 230, 340 is associated with an intersection risk value which at least meets a threshold intersection risk value, the ANS 311 can refrain from parking the vehicle 310 in the space 204 and can cause the vehicle to navigate through the environment to locate another available parking space.

Figure 3C:
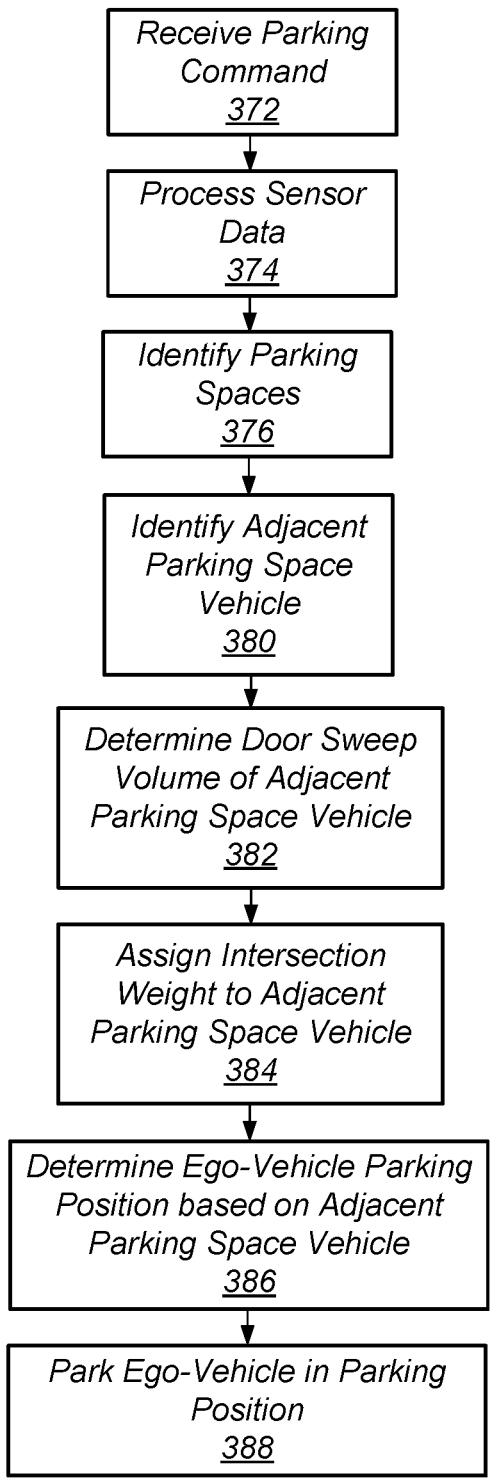
FIG. 3C illustrates parking an ego-vehicle in a particular parking position in an identified available parking space, according to some embodiments.

FIG. 3C illustrates parking an ego-vehicle in a particular parking position in an identified available parking space, according to some embodiments. The parking can be implemented by one or more portions of any embodiment of ANS included in any embodiments herein. An ANS can be implemented by one or more computer systems.

At 372, a parking command is received. The parking command can be received based on one or more of occupant interaction with one or more user interfaces included in one or more of the ego-vehicle, user interaction with one or more user interfaces included in a user device communicatively coupled to the ANS, navigation of the ego-vehicle along one or more portions of a driving route, etc.

At 374 and 376, sensor data representations of one or more portions of the environment are processed and an unoccupied parking space, also referred to herein as an available parking space, is detected in the environment.

Detection of an available parking space can also be referred to as identifying an available parking space.

At 380, one or more objects located proximate to the available parking space are identified. Such object can include one or more vehicles located adjacent to the available parking space. Identifying a vehicle in the environment can include processing a sensor data representation of the vehicle, implementing recognition of one or more features of the vehicle, including a position of one or more doors of the vehicle, a vehicle type of the vehicle, an intersection risk value associated with the vehicle, etc. The intersection risk value can be determined based on the vehicle type. The identifying at 380 can include identifying a position of one or more doors, a door sweep area, volume, etc. of the vehicle, a vehicle type of the vehicle, etc. based on identifying a unique identifier of the vehicle, including information located on a license plate, data generated by a signal generator device included in the vehicle, etc. The identifying at 380 can include identifying various properties of the vehicle, including the vehicle type, based on communicating with a remote computer system and accessing a database where the detected unique identifier can be correlated with a profile associated with the detected vehicle, where the profile can include information indicating the vehicle type. The identifying at 380 can include determine the vehicle type of a vehicle identified adjacent to the available parking space, which can include manufacturer, make, model, etc. based on processing a sensor data representation of the vehicle, accessing a database which indicates door positions, door sweep area, volume, etc., intersection risk value associated with the vehicle, etc.

At 382, a door sweep volume of one or more doors of a detected adjacent vehicle is determined and associated with the one or more doors. The determining can be based on identifying the vehicle at 380. Associating the door sweep volume with the one or more doors can be based on determining a relative position of the one or more doors on the vehicle detected in the environment, based at least in part upon the identifying at 380.

At 384, an intersection weight value is assigned to one or more portions of the adjacent vehicle. The one or more portions can include a door sweep volume of one or more of the doors of the vehicle. The intersection weight value can be determined based on identifying the vehicle at 380 and can be based at least in part upon the vehicle type.

At 386, a particular parking position of the ego-vehicle in the available parking space is determined. The parking position can be selected from a set of potential parking positions in the parking space. For each potential parking position of the set, an aggregate intersection risk value is determined, and the particular parking position which is selected is a potential parking position, of the set, which is associated with a minimum aggregate intersection risk value. The aggregate intersection risk value is determined based on a plurality of intersection risk values associated with separate portions of the potential parking position, where separate intersection risk values are determined for separate door sweep volumes included in the parking position, the vehicle volume included in the parking position, etc. In some embodiments, the aggregate intersection risk value is determined based on one or more intersection risk values associated with one or more separate portions, door sweep volumes, etc. of the one or more adjacent vehicles identified in the environment. For each portion of the potential parking position, portion of an adjacent vehicle, door sweep volume of an adjacent vehicle, a separate intersection risk value is determined based at least in part on a proportion of the portion, door sweep volume, etc. which overlaps one or more objects in the environment, including one or more structures, vehicles, etc.

At 388, the ego-vehicle is caused to be parked in the selected particular parking position in the available parking space. Such causation can include generating a set of control commands which, when communicated to one or more control elements included in the ego-vehicle, are executed by the one or more control elements can cause the ego-vehicle to be navigated along a driving route which causes the vehicle to be parked in the particular parking position in the identified available parking space.

Where each of the potential parking positions in the set of potential parking positions is associated with an aggregate intersection risk value which at least meets a threshold intersection risk value, parking at the identified available parking space is aborted, and the vehicle can be commanded to be navigated along a driving route which enables additional portions of the environment to be monitored for one or more additional available parking spaces. Elements 374-388 can be implemented repeatedly until a at least one parking position in an available parking space is associated with an aggregate intersection risk value which is less than the threshold intersection risk value.

Figure 4A:
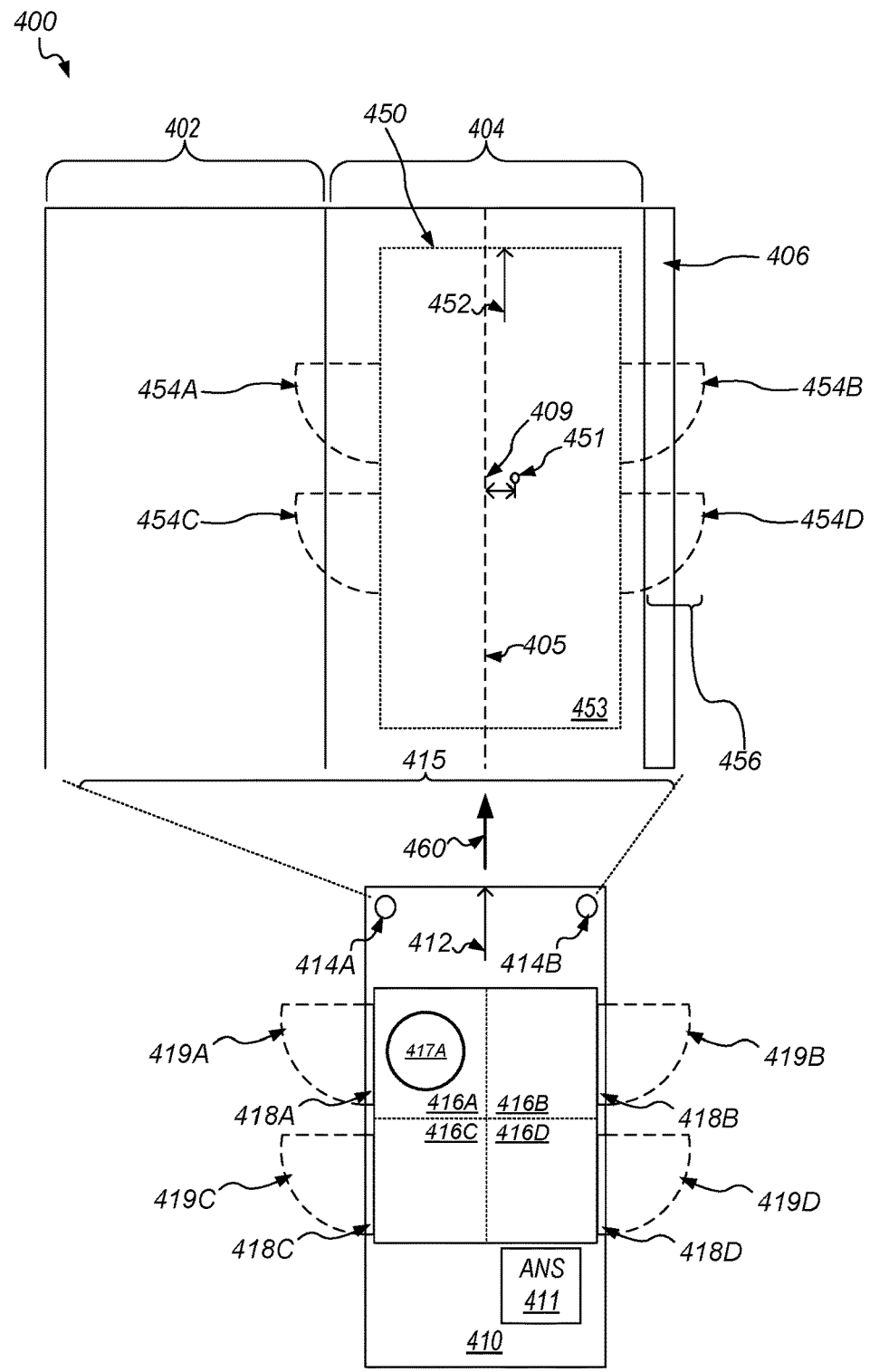
FIG. 4A illustrates an overhead view of an environment in which an ego-vehicle and parking spaces are located and where an ANS installed in the vehicle determines a particular parking position in a particular available parking space in which the vehicle can be parked, according to some embodiments.

FIG. 4A illustrates an overhead view of an environment 400 in which an ego-vehicle 410 and parking spaces 402-404 are located and where an ANS 411 installed in the vehicle 410 determines a particular parking position 450 in a particular available parking space 404 in which the vehicle 410 can be parked, according to some embodiments. Vehicle 410 can include any of the embodiments of vehicles included herein, and ANS 411 can include any of the embodiments of ANSs included herein.

In some embodiments, an ANS installed in a vehicle is configured to determine a parking position in a parking space, and park 460 the ego-vehicle in the determined parking position, based at least in part upon a body morphology of the occupants of the interior of the ego-vehicle. The ANS can select a parking position in the parking space which accommodates spacing needs of occupants of the vehicle based at least in part upon positioning the vehicle to provide sufficient space for one or more vehicle doors associated with portions of the vehicle interior predicted to be occupied by the occupants. The spacing needs of an occupant can be determined based at least in part upon a body morphology of the occupant. For example, an occupant associated with an elderly body morphology may require more space to exit the vehicle than an occupant associated with an adult body morphology, and the ANS can park the vehicle in a parking position which is selected to account for occupant body morphology.

As shown, vehicle 410 is located near a set of parking spaces 402-404, and sensor devices 414A-B installed in a rear portion of the vehicle 410 are monitoring 415 a particular available parking space 404. ANS 411 determines various geometric properties of the parking space 404, including a centerline 405. ANS 411 can further determine that a side of the parking space 404 is bounded by a wall structure 406.

ANS 411, in some embodiments, is configured to select a particular parking position in which to park the ego-vehicle 410 in the parking space 404. The particular parking position 450 shown in FIG. 4 is offset 451 from the centerline of the space 404 and is oriented 452 away from an exit of the space 404, so that parking 460 the ego-vehicle 410 in the position 450 includes orienting the ego-vehicle 410 so that the front end 412 of the ego-vehicle aligns with the orientation 452 of the position 450.

In some embodiments, ANS 411 is configured to select a particular parking position 450 based on an occupancy of the vehicle 410. The vehicle can determine a present occupancy of the vehicle, which can include determining that one or more occupants associated with one or more particular properties are occupying one or more particular portions of the vehicle interior, based on processing sensor data generate by one or more sensor devices included in the vehicle. The ANS can associate one or more occupants with one or more body morphologies based on monitoring the one or more occupants via processing sensor data.

As shown, vehicle 410 includes interior 416 which comprises separate particular portions 416A-D, where each separate portion 416 is associated with a particular door 418 of the vehicle 410 and where each door 418A-D is associated with a separate door sweep volume 419A-D. Vehicle 410 includes a present occupant 417A located in portion 416A of the vehicle interior. The ANS 411 can associate the occupant 417 with a user profile based on sensor data representations of the occupant, generated by one or more sensor devices in the vehicle, sensor data representation data associated with the user profile, etc. In some embodiments, the ANS 411 can associate a particular one or more body morphologies with the occupant 417A based on monitoring the occupant 417A. In some embodiments, the ANS 411 is configured for associate one or more body morphologies with the occupant 417A based on monitoring the occupant prior to the occupant entering the vehicle interior. For example, the ANS 411 can monitor the occupant as the occupant approaches the vehicle and can associate the occupant with a body morphology based on the monitoring.

As shown, the parking position 450 includes a portion 453 which correlates to a footprint of the vehicle 410 and portions 454A-D which correlate to the door sweep volumes 419A-D of the doors 418A-D of the vehicle. Based on the occupant 417A of the vehicle 410, ANS 411 can associate, assign, etc. a particular spacing weight value with a particular door sweep volume 419A of a door 418A associated with the particular portion 416A of the interior which the occupant 417A occupies. The spacing weight value assigned to volume 419A can be associated with one or more parameters of the occupant 417A, including a body morphology of the occupant 417A, a user profile of the occupant 417A, some combination thereof, etc.

ANS 411 can determine an aggregate intersection risk value for the position 450 based on determining separate intersection risk values for the separate portions 453, 454A-D of the position 450. The aggregate intersection risk value can be a sum of the separate intersection risk values. Each separate intersection risk calculated for a separate portion 453-454 can be based on a spacing weight value assigned to the portion and a proportion of the portion which overlaps with one or more particular portions of the environment, including a portion of the environment which is external to the parking space 404, an object located proximate to the parking space 404, etc. For example, an intersection risk value calculated for portion 454A can be a product of the spacing weight value assigned to volume 419A and the proportion of overlap 456 of the portion 454A with the wall structure 406 bounding the space.

As shown, the particular position 450 is positioned, offset 451 from the centerline 405 of the space, so that the portion 454A corresponding to door volume 419A projects into space 402 and is distal from wall 406, relative to the footprint 453 portion. As a result, the intersection risk value computed for portion 454A can be relatively low, as the portion 454A does not overlap any objects in the environment. While portions 454B-D overlap 456 wall 406, the spacing weight value assigned to the portions 454B-D can be less than the value assigned to portion 454A, a null value, etc., as neither door 418B-D corresponding to portions 454B-D is associated with an occupied interior portion. As a result, the aggregate intersection risk value computed for position 450 can be less than other potential parking positions in the space 404.

Figure 4B:
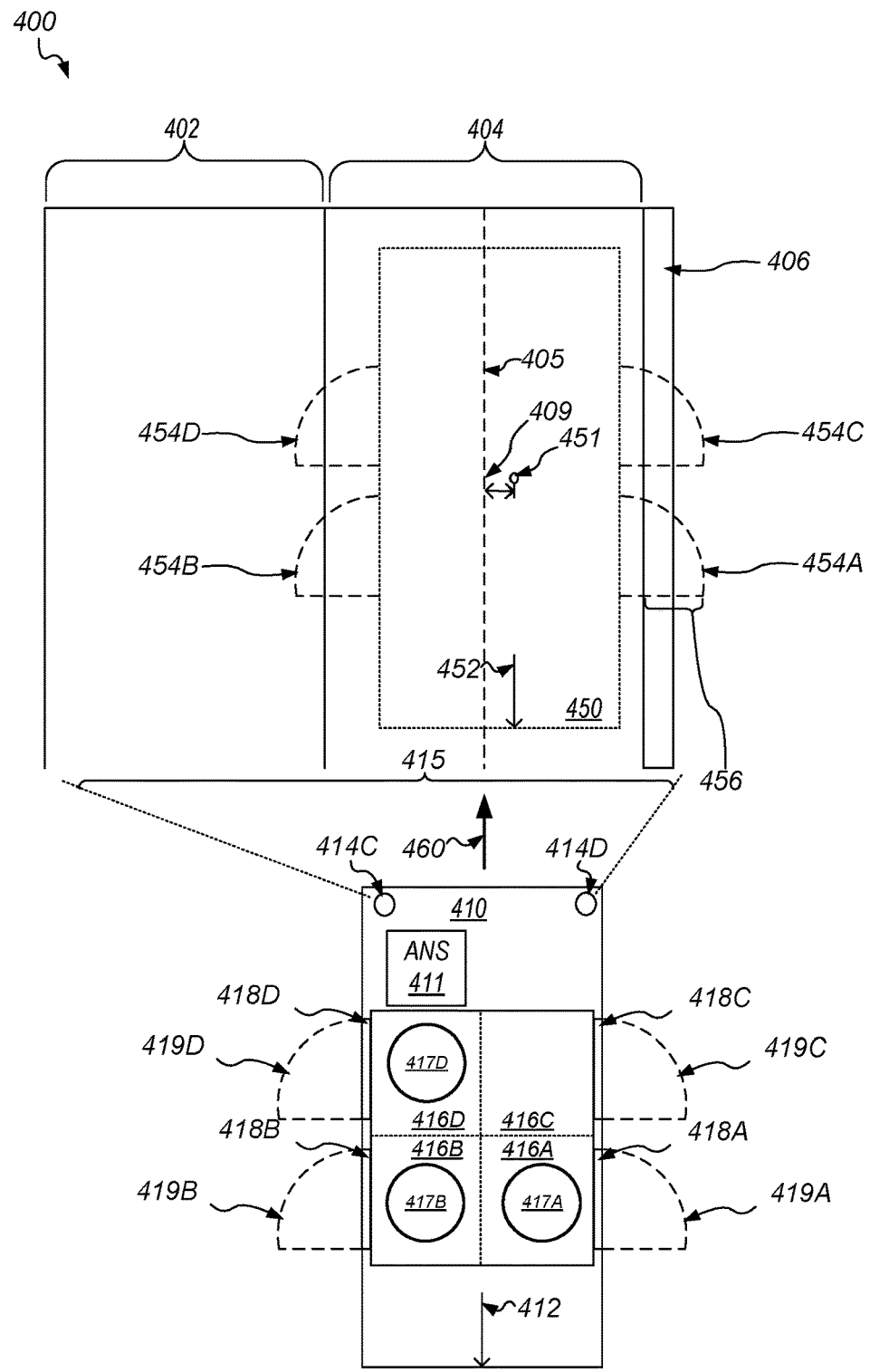
FIG. 4B illustrates an overhead view of an environment in which an ego-vehicle and parking spaces are located and where an ANS installed in the vehicle determines a particular parking position in a particular available parking space in which the vehicle can be parked, according to some embodiments.

FIG. 4B illustrates an overhead view of an environment 400 in which an ego-vehicle 410 and parking spaces 402-404 are located and where an ANS 411 installed in the vehicle 410 determines a particular parking position 450 in a particular available parking space 404 in which the vehicle 410 can be parked, according to some embodiments. Vehicle 410 can include any of the embodiments of vehicles included herein, and ANS 411 can include any of the embodiments of ANSs included herein.

In some embodiments, the ANS 411 is configured to select a parking position which is associated with a minimal aggregate intersection risk value, even though such a position can result in at least partial obstruction of door sweep volume for one or more occupants. For example, as shown in FIG. 4B, where vehicle 410 includes occupants 417A-B, D in vehicle interior portions 416A-B, D, spacing weight values can be assigned to portions 454A-B, D based on the body morphologies of the occupants. Where the body morphologies of occupants 417B-D result in a greater spacing weight value being assigned to portions 454B-D than portion 454A, an aggregate intersection risk value determined for position 450 can be minimized where the position 450 is positioned and oriented in space 404 so that the proportion of overlap of portions 454B-D is minimized, although at the expense of overlap 456 of portion 454A.

Figure 4C:
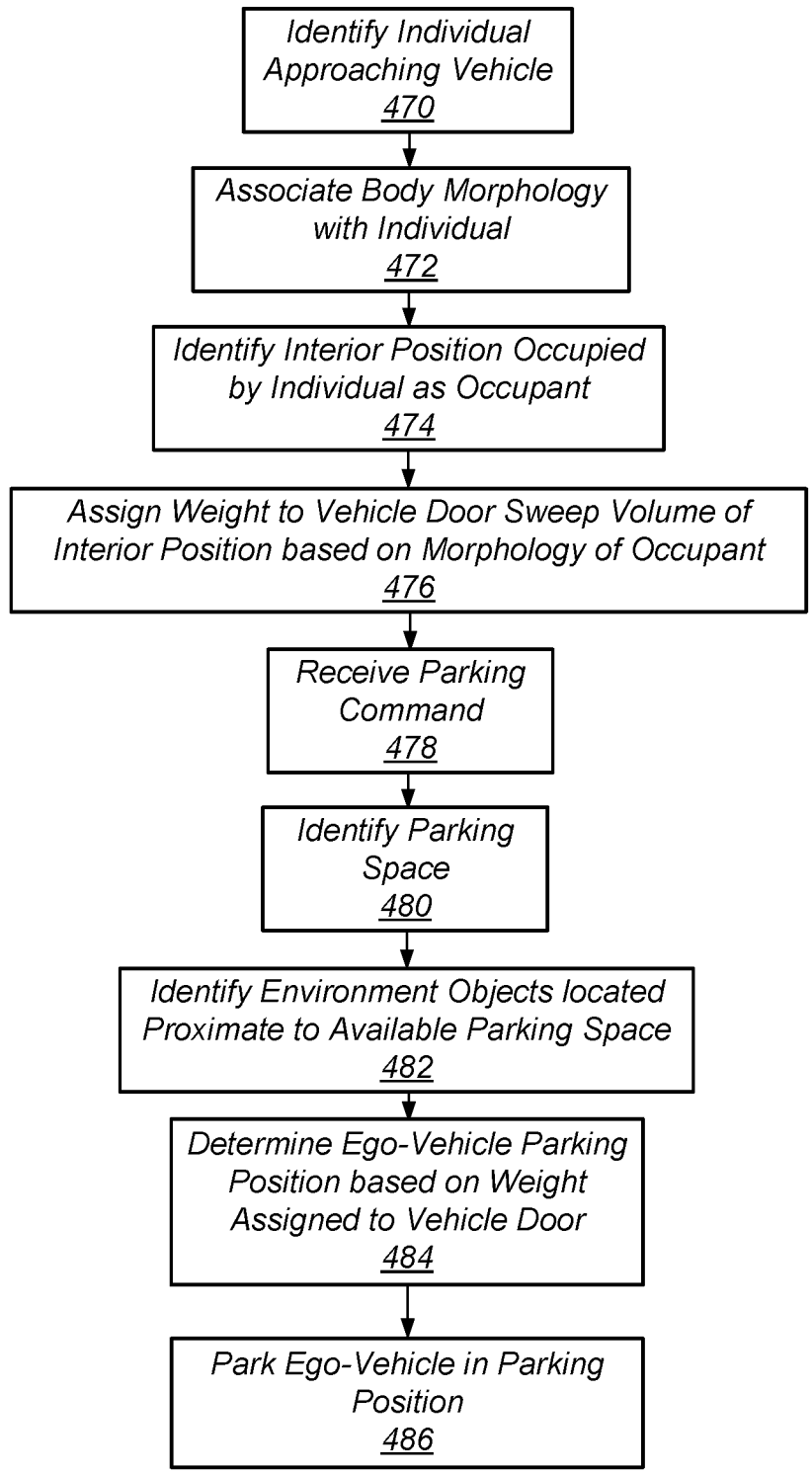
FIG. 4C illustrates parking an ego-vehicle in a particular parking position in an identified available parking space, according to some embodiments.

FIG. 4C illustrates parking an ego-vehicle in a particular parking position in an identified available parking space, according to some embodiments. The parking can be implemented by one or more portions of any embodiment of ANS included in any embodiments herein. An ANS can be implemented by one or more computer systems.

At 470, an individual is detected approaching the ego-vehicle, based on processing sensor data generated by one or more sensor devices. At 472, a particular body morphology is associated with the individual based on monitoring the individual. The association can be based on associating the individual with a particular user profile, based on facial recognition, monitoring body motions of the individual approaching the vehicle, identifying one or more mobility aids, including a wheelchair, cane, crutch, etc. being utilized by the individual, etc.

At 474, subsequent to the individual occupying a particular portion of the vehicle interior, the particular portion is identified and associated with the occupant. At 476, a spacing weight value associated with the occupant is assigned to a door sweep volume of a door associated with the interior portion. The value can be determined based on the occupant morphology.

At 478, a parking command is received. The parking command can be received based on one or more of occupant interaction with one or more user interfaces included in one or more of the ego-vehicle, user interaction with one or more user interfaces included in a user device communicatively coupled to the ANS, navigation of the ego-vehicle along one or more portions of a driving route, etc.

At 480, sensor data representations of one or more portions of the environment are processed and an unoccupied parking space, also referred to herein as an available parking space, is detected in the environment.

At 482, one or more objects located proximate to the available parking space are identified. Such object can include one or more vehicles located adjacent to the available parking space, one or more objects which define one or more boundaries of the available parking space, including one or more wall structures, curb structures, etc.

At 484, a particular parking position of the ego-vehicle in the available parking space is determined. The parking position can be selected from a set of potential parking positions in the parking space. For each potential parking position of the set, an aggregate intersection risk value is determined, and the particular parking position which is selected is a potential parking position, of the set, which is associated with a minimum aggregate intersection risk value. The aggregate intersection risk value is determined based on a plurality of intersection risk values associated with separate portions of the potential parking position, where separate intersection risk values are determined for separate door sweep volumes included in the parking position, the vehicle volume included in the parking position, etc. For each portion of the potential parking position, a separate intersection risk value is determined based at least in part on a proportion of the portion which overlaps one or more objects in the environment, including one or more structures, vehicles, etc. Where the portion of the potential parking position comprises a door sweep volume of a door included in the ego-vehicle, a separate intersection risk value is determined for the door sweep volume based at least in part upon a proportion of the portion which overlaps one or more objects in the environment and a space weight value assigned to the door sweep volume.

At 486, the ego-vehicle is caused to be parked in the selected particular parking position in the available parking space. Such causation can include generating a set of control commands which, when communicated to one or more control elements included in the ego-vehicle, are executed by the one or more control elements can cause the ego-vehicle to be navigated along a driving route which causes the vehicle to be parked in the particular parking position in the identified available parking space.

Where each of the potential parking positions in the set of potential parking positions is associated with an aggregate intersection risk value which at least meets a threshold intersection risk value, parking at the identified available parking space is aborted, and the vehicle can be commanded to be navigated along a driving route which enables additional portions of the environment to be monitored for one or more additional available parking spaces. Elements 474-484 can be implemented repeatedly until a at least one parking position in an available parking space is associated with an aggregate intersection risk value which is less than the threshold intersection risk value.

Figure 5A:
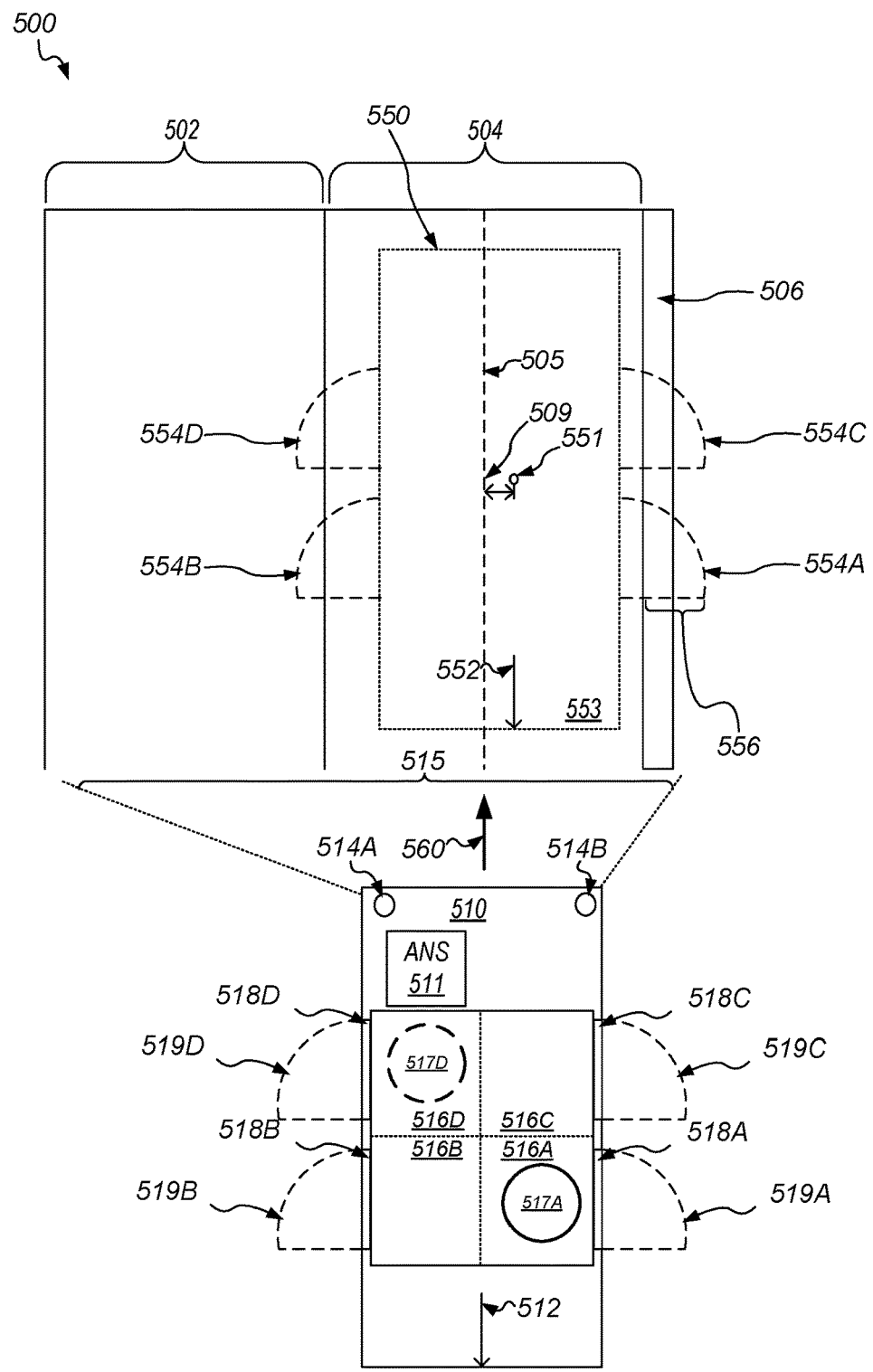
FIG. 5A illustrates an overhead view of an environment in which an ego-vehicle and parking spaces are located and where an ANS installed in the vehicle determines a particular parking position in a particular available parking space in which the vehicle can be parked, according to some embodiments.

FIG. 5A illustrates an overhead view of an environment 500 in which an ego-vehicle 510 and parking spaces 502-504 are located and where an ANS 511 installed in the vehicle 510 determines a particular parking position 550 in a particular available parking space 504 in which the vehicle 510 can be parked, according to some embodiments. Vehicle 510 can include any of the embodiments of vehicles included herein, and ANS 511 can include any of the embodiments of ANSs included herein.

In some embodiments, an ANS installed in a vehicle is configured to determine a parking position in a parking space, and park the ego-vehicle in the determined parking position, based at least in part upon predicted occupancy of the interior of the ego-vehicle. Where the vehicle is predicted to receive one or more additional occupants prior to the vehicle leaving the parking space, the ANS can select a parking position in the parking space which accommodates the predicted occupants based at least in part upon positioning the vehicle to provide sufficient space for one or more vehicle doors associated with portions of the vehicle interior predicted to be occupied by the predicted occupants.

As shown, vehicle 510 is located near a set of parking spaces 502-504, and sensor devices 514A-B installed in a rear portion of the vehicle 510 are monitoring 515 a particular available parking space 504. ANS 511 determines various geometric properties of the parking space 504, including a centerline 505. ANS 511 can further determine that a side of the parking space 504 is bounded by a wall structure 506.

ANS 511, in some embodiments, is configured to select a particular parking position in which to park the ego-vehicle 510 in the parking space 504. The particular parking position 550 shown in FIG. 5 is offset 551 from the centerline of the space 504 and is oriented 552 towards an exit of the space 504, so that parking the ego-vehicle 510 in the position 550 includes orienting the ego-vehicle 510 so that the front end 512 of the ego-vehicle aligns with the orientation 552 of the position 550.

In some embodiments, ANS 511 is configured to select a particular parking position 550 based on a predicted occupancy of the vehicle 510 at a future time prior to the vehicle leaving the parking space 504. The vehicle can predict a particular occupancy, which can include predicting that a certain set of one or more occupants associated with one or more particular properties will occupy one or more particular portions of the vehicle interior, based on one or more of a present occupancy of the vehicle, a present location of the vehicle, a present time, some combination thereof, etc. For example, the ANS can access a historical record of occupant additions to the vehicle interior which associates the additions with one or more of a date, time of day, day of the week, location, present occupant prior to the occupant addition, etc. The historical record can include information associated with a user profile of a present occupant, including a personal schedule.

As shown, vehicle 510 includes interior 516 which comprises separate particular portions 516A-D, where each separate portion 516 is associated with a particular door 518 of the vehicle 510 and where each door 518A-D is associated with a separate door sweep volume 519A-D. Vehicle 510 includes a present occupant 517A located in portion 516A of the vehicle interior. The ANS 511 can associate the occupant 517 with a user profile based on sensor data representations of the occupant, generated by one or more sensor devices in the vehicle, sensor data representation data associated with the user profile, etc. The ANS 511 can determine, based on one or more parameters, that a predicted occupancy of the vehicle 510 includes an occupant 517D in portion 516D of the vehicle interior 516D. In some embodiments, the ANS 511 determines that the predicted occupant 517D is associated with one or more particular body morphologies, door spacing preferences, user profiles, etc. The determination can be based on a historical record of occupant additions, where the record includes a historical record of body morphologies of occupants entering the vehicle at one or more various times, locations, etc. In some embodiments, the determination can be based on a determination that a probability that the one or more occupants will enter one or more particular portions of the vehicle interior at the parking space, prior to the vehicle leaving the parking space at a future time, etc. at least meets a probability threshold value. In some embodiments, the determination can be based on a determination that a probability that the one or more occupants will board one or more particular portions of the vehicle interior at the present local time at least meets a probability threshold value, based on at least one historical record of vehicle occupant additions associated with the present local time.

As shown, the parking position 550 includes a portion 553 which correlates to a footprint of the vehicle 510 and portions 554A-D which correlate to the door sweep volumes 519A-D of the doors 518A-D of the vehicle. Based on the predicted occupant 517D of the vehicle 510 prior to the vehicle leaving the parking space 504, ANS 511 can associate, assign, etc. a particular spacing weight value with a particular door sweep volume 519D of a door 518D associated with the particular portion 516D of the interior in which the occupant 517D is predicted to occupy. The spacing weight value assigned to volume 519D can be associated with one or more parameters of the occupant 517D, including a body morphology of the predicted occupant 517D, a user profile of the occupant 517D, some combination thereof, etc. Similarly, a spacing weight value associated with occupant 517A can be assigned to volume 519A and thus the portion 554A of the parking position 550 which corresponds to volume 519A.

ANS 511 can determine an aggregate intersection risk value for the position 550 based on determining separate intersection risk values for the separate portions 553, 554A-D of the position 550. The aggregate intersection risk value can be a sum of the separate intersection risk values. Each separate intersection risk calculated for a separate portion 553-554 can be based on a spacing weight value assigned to the portion and a proportion of the portion which overlaps with one or more particular portions of the environment, including a portion of the environment which is external to the parking space 504, an object located proximate to the parking space 504, etc. For example, an intersection risk value calculated for portion 554A can be a product of the spacing weight value assigned to volume 519A and the proportion of overlap 556 of the portion 554A with the wall structure 506 bounding the space.

As shown, the particular position 550 is oriented so that the portion 554D corresponding to door volume 519D projects into space 502 and is distal from wall 506, relative to the footprint 553 portion. As a result, parking vehicle 510 in the position 550 results in door 518D facing into space 502. The position 550 can be selected based on a determination that the predicted morphology of occupant 517 requires more space to enter the vehicle, and thus is associated with a greater spacing weight value, than occupant 517A. As a result, the selected position 553 enables the ego-vehicle 510 to be positioned to optimize available space for the predicted occupant 517D to enter portion 516D of the vehicle interior 516, relative to occupant 517A. The position 550 can be selected from a set of potential parking positions, where the aggregate intersection risk value of position 550 is less than the aggregate intersection risk values of other potential parking positions, which may receive higher intersection risk values as a result of including greater overlap of portion 554D with other elements of the environment, including wall 506. Based on selection of position 550, the ANS 551 can navigate 560 the vehicle 510 to be parked in position 550 of space 504.

Figure 5B:
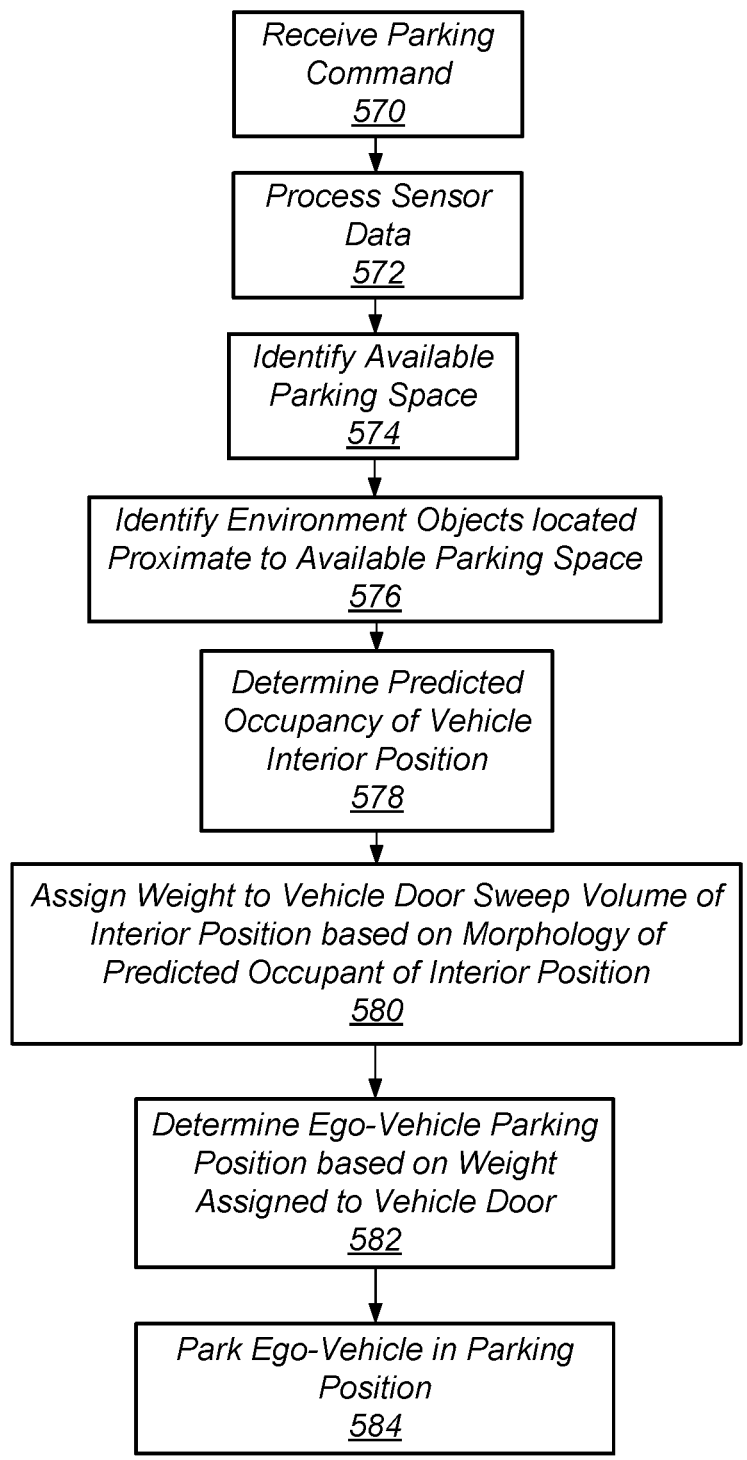
FIG. 5B illustrates parking an ego-vehicle in a particular parking position in an identified available parking space, according to some embodiments.

FIG. 5B illustrates parking an ego-vehicle in a particular parking position in an identified available parking space, according to some embodiments. The parking can be implemented by one or more portions of any embodiment of ANS included in any embodiments herein. An ANS can be implemented by one or more computer systems.

At 570, a parking command is received. The parking command can be received based on one or more of occupant interaction with one or more user interfaces included in one or more of the ego-vehicle, user interaction with one or more user interfaces included in a user device communicatively coupled to the ANS, navigation of the ego-vehicle along one or more portions of a driving route, etc.

At 572 and 574, sensor data representations of one or more portions of the environment are processed and an unoccupied parking space, also referred to herein as an available parking space, is detected in the environment.

At 576, one or more objects located proximate to the available parking space are identified. Such object can include one or more vehicles located adjacent to the available parking space, one or more objects which define one or more boundaries of the available parking space, including one or more wall structures, curb structures, etc.

At 578, a predicted occupancy of one or more positions of the vehicle interior is determined. Predicted occupancy can comprise a predicted occupancy of the vehicle at a future point in time at which the vehicle is navigated away from the parking space. Predicted occupancy can include predicted occupants in one or more particular portions of the vehicle interior, body morphology associated with one or more of the predicted occupants, user profiles associated with one or more of the predicted occupants, door spacing preferences associated with one or more of the predicted occupants, some combination thereof, etc.

At 580, a separate spacing weight is assigned to a door sweep volume associated with each separate door of the vehicle. Each door can be associated with a particular portion of the vehicle interior, and a particular spacing weight can be assigned to a door sweep volume of a given door based on one or more properties of a predicted occupant of the particular portion of the vehicle interior associated with the given door, including one or more of body morphology, associated user profile, door spacing preference, etc. Where an occupant is detected as presently occupying a particular portion of the vehicle interior, a particular spacing weight value can be assigned to a door sweep volume of a door associated with the particular portion, based on one or more properties associated with the detected occupant.

At 582, a particular parking position of the ego-vehicle in the available parking space is determined. The parking position can be selected from a set of potential parking positions in the parking space. For each potential parking position of the set, an aggregate intersection risk value is determined, and the particular parking position which is selected is a potential parking position, of the set, which is associated with a minimum aggregate intersection risk value. The aggregate intersection risk value is determined based on a plurality of intersection risk values associated with separate portions of the potential parking position, where separate intersection risk values are determined for separate door sweep volumes included in the parking position, the vehicle volume included in the parking position, etc. For each portion of the potential parking position, a separate intersection risk value is determined based at least in part on a proportion of the portion which overlaps one or more objects in the environment, including one or more structures, vehicles, etc. Where the portion of the potential parking position comprises a door sweep volume of a door included in the ego-vehicle, a separate intersection risk value is determined for the door sweep volume based at least in part upon a proportion of the portion which overlaps one or more objects in the environment and a space weight value assigned to the door sweep volume.

At 584, the ego-vehicle is caused to be parked in the selected particular parking position in the available parking space. Such causation can include generating a set of control commands which, when communicated to one or more control elements included in the ego-vehicle, are executed by the one or more control elements can cause the ego-vehicle to be navigated along a driving route which causes the vehicle to be parked in the particular parking position in the identified available parking space.

Where each of the potential parking positions in the set of potential parking positions is associated with an aggregate intersection risk value which at least meets a threshold intersection risk value, parking at the identified available parking space is aborted, and the vehicle can be commanded to be navigated along a driving route which enables additional portions of the environment to be monitored for one or more additional available parking spaces. Elements 574-584 can be implemented repeatedly until a at least one parking position in an available parking space is associated with an aggregate intersection risk value which is less than the threshold intersection risk value.

Figure 6:
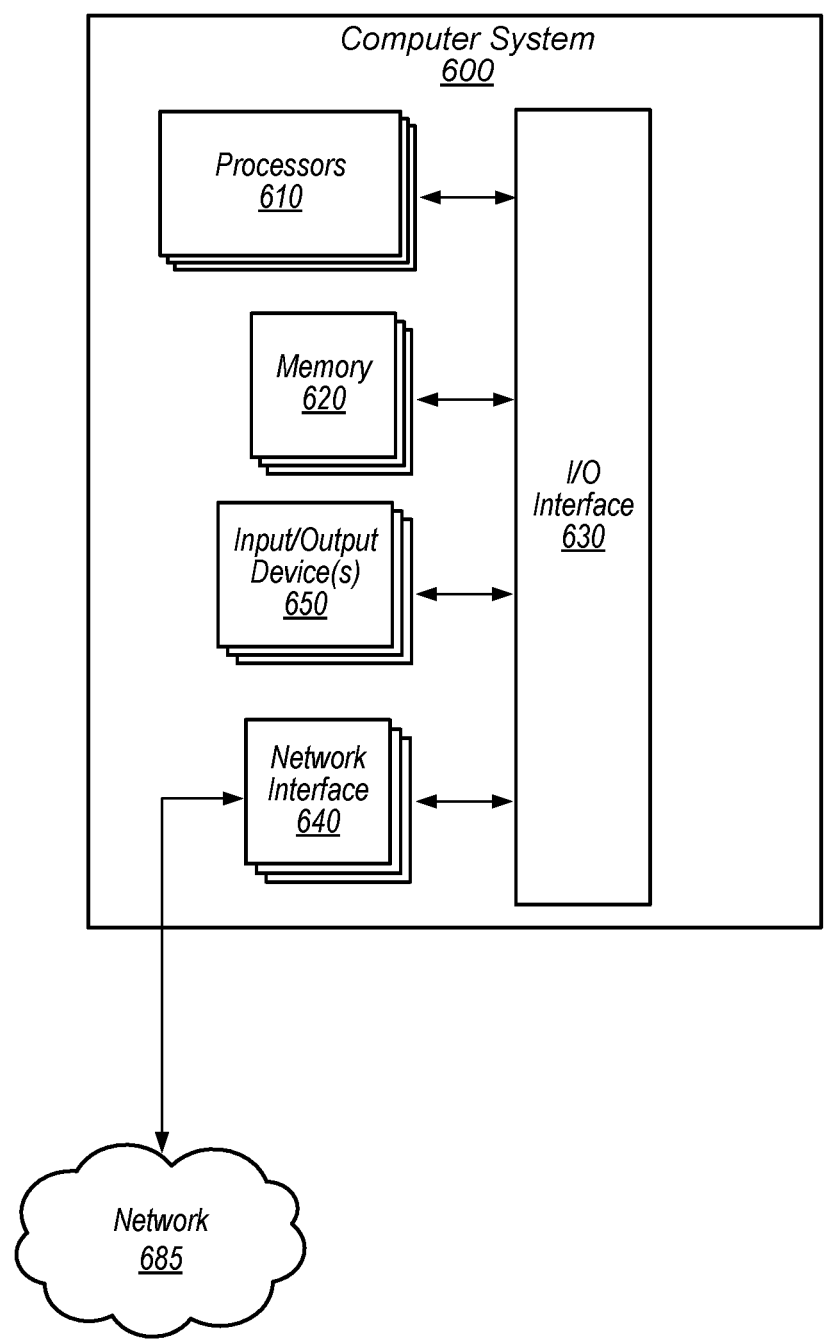
FIG. 6 illustrates a computer system that may be configured to include or execute any or all of the embodiments described herein.

FIG. 6 illustrates an example computer system 600 that may be configured to include or execute any or all of the embodiments described above. In different embodiments, computer system 600 may be any of various types of devices, including, but not limited to, a personal computer system, desktop computer, laptop, notebook, tablet, slate, pad, or netbook computer, cell phone, smartphone, PDA, portable media device, mainframe computer system, hand-held computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of an autonomous navigation system (ANS), as described herein, may be executed in one or more computer systems 600, which may interact with various other devices. Note that any component, action, or functionality described above with respect to FIGS. 1 through 5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices, which can include one or more user interface (also referred to as "input interface") devices. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions, data, etc. accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 620 may be configured to implement some or all of an ANS, incorporating any of the functionality described above. Additionally, existing control data of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 600. Multiple input/output devices may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   an autonomous navigation system configured to be installed in an ego-vehicle and autonomously park the ego-vehicle in an environment in which the ego-vehicle is located, wherein the autonomous navigation system is configured to, in response to a command to park the ego-vehicle:
   select a particular parking position of the ego-vehicle within a detected available parking space, from a set of potential parking positions within the detected available parking space, based at least in part upon:
      a proximity of at least one door sweep volume of a door on a detected vehicle based at least in part upon recognition of a vehicle type associated with the detected vehicle according to one or more unique identifiers associated with the detected vehicle, wherein the detected vehicle is separate from the ego-vehicle and located proximate to the particular parking position selected by the ego-vehicle, and wherein the door sweep volume comprises a space through which the door is configured to sweep through the environment when the door is opened, or
      a predicted occupancy of one or more portions of an interior of the ego-vehicle at a future time prior to the vehicle leaving the detected available parking space; and
   generate a set of control commands which, when executed by one or more control elements installed in the ego-vehicle, cause the ego-vehicle to be navigated along a driving route which results in the ego-vehicle being positioned in the particular parking position in the detected available parking space.

2. The apparatus of claim 1, wherein:
   to select the particular parking position based at least in part upon a proximity of at least one door sweep volume of a door on a detected vehicle to the particular parking position, the autonomous navigation system is configured to:

identify the door of the detected vehicle on a particular position on the detected vehicle;

determine the door sweep volume of the door on the detected vehicle;

assign a spacing weight value with the door sweep volume;

assign separate aggregate intersection risk values with each potential parking position of the set of potential parking positions, based at least in part upon, for each potential parking position, a determined proportion of the door sweep volume which overlaps the given potential parking position and the spacing weight value assigned to the door sweep volume; and select, as the particular parking position of the ego-vehicle, a particular potential parking position, of the set of potential parking positions, associated with a minimum aggregate intersection risk value for the set of potential parking positions.

3. The apparatus of claim 2, wherein the autonomous navigation system is configured to:

identify the door of the detected vehicle on a particular position on the detected vehicle, and determine the door sweep volume of the door, based at least in part upon recognition of the vehicle type associated with the detected vehicle.

4. The apparatus of claim 3, wherein the autonomous navigation system is configured to:

associate the spacing weight value with one or more portions of the detected vehicle, based at least in part upon recognition of the vehicle type associated with the detected vehicle.

5. The apparatus of claim 4, wherein:

recognition of the vehicle type associated with the detected vehicle is based at least in part upon at least one of:

identifying the one or more unique identifiers associated with the detected vehicle, based on processing at least one sensor data representation, of the detected vehicle, generated by one or more sensor devices installed in the ego-vehicle;

determining a particular vehicle type associated with the identified one or more unique identifiers, wherein the particular vehicle type comprises one or more of a make, a model, a year, or any combination thereof, of the detected vehicle.

6. The apparatus of claim 1, wherein:

the at least one detected vehicle comprises at least two separate vehicles presently located adjacent to the detected available parking space; and to determine a particular parking position of the ego-vehicle within a detected available parking space, the autonomous navigation system is configured to:

associate spacing weight values with the at least two separate vehicles;

for each separate potential parking position, of the set of potential parking positions within the detected available parking space, determine a separate aggregate intersection risk value associated with the given potential parking position, based at least in part upon, for each of the at least two separate vehicles, a proximity of the given potential parking position to the respective one of the at least two separate vehicles and the spacing weight value assigned to the respective one of the at least two separate vehicles; and select, as the particular parking position of the ego-vehicle, a particular parking position of the set of potential parking positions associated with a minimum aggregate intersection risk value.

7. The apparatus of claim 1, wherein:

at least one potential parking position, of the set of potential parking positions, comprises a particular orientation of the ego-vehicle relative to the detected available parking space.

8. The apparatus of claim 1, wherein:

selection of a particular parking position of the ego-vehicle within a detected available parking space, from a set of potential parking positions of the ego-vehicle within the detected available parking space, is further based at least in part upon detection of one or more occupants in one or more particular portions of an interior of the ego-vehicle, the autonomous navigation system is configured to:

for each occupant detected in the interior:

identify a door of the ego-vehicle associated with the portion of the interior occupied by the given occupant;

determine a particular spacing weight value associated with the occupant based on one or more determined properties of the given occupant; and assign the particular spacing weight value to a door sweep volume through which the identified door is configured to sweep through the environment when the identified door is opened;

for each potential parking position of the set of potential parking positions:

determine a separate intersection risk value for each door sweep volume comprised in the given potential parking position, based at least in part upon the respective spacing weight value assigned to the respective door sweep volume and a proportion of the door sweep volume comprised in the given potential parking position which overlaps at least some of one or more objects located in the environment; and determine an aggregate intersection risk value for the given potential parking position, based at least in part upon the separate intersection risk values determined for each door sweep volume comprised in the given potential parking position; and selecting, as the particular parking position of the ego-vehicle, a particular parking position of the set of potential parking positions associated with a minimum aggregate intersection risk value.

9. The apparatus of claim 8, wherein:

the autonomous navigation system is configured to, for at least one occupant detected in the interior, determine a particular spacing weight value associated with the occupant based on a determined body morphology of the at least one occupant.

10. The apparatus of claim 9, wherein:

the autonomous navigation system is configured to determine a body morphology of the at least one occupant based on processing at least one sensor data representation, generated by at least one sensor device installed in the ego-vehicle, of at least a portion of the at least one occupant.

11. The apparatus of claim 10, wherein:

the autonomous navigation system is configured to determine a body morphology of the at least one occupant based on monitoring one or more body motions of the at least one occupant prior to the at least one occupant entering the interior of the ego-vehicle.

12. The apparatus of claim 9, wherein:
the autonomous navigation system is further configured to determine a particular spacing weight value associated with the occupant based on:
   associating the occupant with a particular user profile, based on processing at least one sensor data representation of at least a portion of the at least one occupant; and
   identifying a spacing weight value associated with the particular user profile.

13. The apparatus of claim 1, wherein:
the predicted occupancy of one or more portions of an interior of the ego-vehicle comprises a predicted occupancy of one or more particular portions of the interior by one or more occupants associated with one or more particular body morphologies.

14. The apparatus of claim 13, wherein:
the autonomous navigation system is configured to determine the predicted occupancy of one or more particular portions of the interior by one or more occupants associated with one or more particular body morphologies based at least in part upon:
   determining a present position of the ego-vehicle in the environment; and
   determining that a probability that the one or more occupants will board one or more particular portions of the ego-vehicle interior at the present location at least meets a probability threshold value, based on at least one historical record of ego-vehicle occupant additions associated with the present position.

15. The apparatus of claim 13, wherein:
the autonomous navigation system is configured to determine the predicted occupancy of one or more particular portions of the interior by one or more occupants associated with one or more particular body morphologies based at least in part upon:
   determining a present local time; and
   determining that a probability that the one or more occupants will board one or more particular portions of the ego-vehicle interior at the present local time at least meets a probability threshold value, based on at least one historical record of ego-vehicle occupant additions associated with the present local time.

16. The apparatus of claim 13, wherein:
to select a particular parking position of the ego-vehicle within a detected available parking space, based at least in part upon a predicted occupancy of one or more portions of an interior of the ego-vehicle, the autonomous navigation system is configured to:
   for at least each predicted occupant of the interior:
      identify a door of the ego-vehicle associated with the portion of the interior predicted to be occupied by the given occupant;
      determine a particular spacing weight value associated with the predicted occupant based on one or more particular body morphologies of the given occupant; and
      associate the particular spacing weight value with a door sweep volume through which the identified door is configured to sweep through the environment when the identified door is opened;
   for each potential parking position of the set of potential parking positions:
      determine a separate intersection risk value for each door sweep volume comprised in the given potential parking position, based at least in part upon the respective spacing weight value associated with the respective door sweep volume and a proportion of the door sweep volume comprised in the given potential parking position which overlaps at least some of one or more objects located in the environment; and
      determine an aggregate intersection risk value for the given potential parking position, based at least in part upon the separate intersection risk values determined for each door sweep volume comprised in the given potential parking position; and
   select, as the particular parking position of the ego-vehicle, a particular parking position of the set of potential parking positions associated with a minimum aggregate intersection risk value.

17. The apparatus of claim 16, wherein:
at least one potential parking position, of the set of potential parking positions, comprises a particular orientation of the ego-vehicle relative to the detected available parking space.

18. A method, comprising:
performing by an autonomous navigation system of an ego-vehicle, in response to a command to park the ego-vehicle:
   selecting a particular parking position of the ego-vehicle within a detected available parking space, from a set of potential parking positions within the detected available parking space, based at least in part upon:
      a proximity of at least one door sweep volume of a door on a detected vehicle based at least in part upon recognition of a vehicle type associated with the detected vehicle according to one or more unique identifiers associated with the detected vehicle, wherein the detected vehicle is being separate from the ego-vehicle and located proximate to the particular parking position selected by the ego-vehicle, wherein the door sweep volume comprises a space through which the door is configured to sweep through when the door is opened, or
      a predicted occupancy of one or more portions of an interior of the ego-vehicle at a future time prior to the vehicle leaving the detected available parking space; and
   generating a set of control commands which, when executed by one or more control elements installed in the ego-vehicle, cause the ego-vehicle to be navigated along a driving route which results in the ego-vehicle being positioned in the particular parking position in the detected available parking space.

19. The method of claim 18, wherein:
selecting the particular parking position based at least in part upon a proximity of at least one door sweep volume of a door on a detected vehicle to the particular parking position, comprises:
   identifying the door of the detected vehicle on a particular position on the detected vehicle;
   determining the door sweep volume of the door on the detected vehicle;
   assigning a spacing weight value with the door sweep volume;
   assigning separate aggregate intersection risk values with each potential parking position of the set of potential parking positions, based at least in part upon, for each potential parking position, a determined proportion of the door sweep volume which overlaps the given potential parking position and the spacing weight value assigned to the door sweep volume; and selecting, as the particular parking position of the ego-vehicle, a particular potential parking position, of the set of potential parking positions, associated with a minimum aggregate intersection risk value for the set of potential parking positions.

20. A non-transitory computer readable medium storing program instructions that when executed by an autonomous navigation system of an ego-vehicle cause the autonomous navigation system to:

select, in response to a command to park the ego-vehicle, a particular parking position of the ego-vehicle within a detected available parking space, from a set of potential parking positions within the detected available parking space, based at least in part upon:

a proximity of at least one door sweep volume of a door on a detected vehicle based at least in part upon recognition of a vehicle type associated with the detected vehicle according to one or more unique identifiers associated with the detected vehicle, wherein the detected vehicle is being separate from the ego-vehicle and located proximate to the particular parking position selected by the ego-vehicle, wherein the door sweep volume comprises a space through which the door is configured to sweep through when the door is opened, or a predicted occupancy of one or more portions of the interior of the ego-vehicle at a future time prior to the vehicle leaving the detected available parking space; and generate a set of control commands which, when executed by one or more control elements installed in the ego-vehicle, cause the ego-vehicle to be navigated along a driving route which results in the ego-vehicle being positioned in the particular parking position in the detected available parking space.

* * * * *